July 20, 1943.  H. R. VOORHEES ET AL  2,324,742
MOTOR VEHICLE LIGHTING
Filed July 3, 1941  4 Sheets-Sheet 1
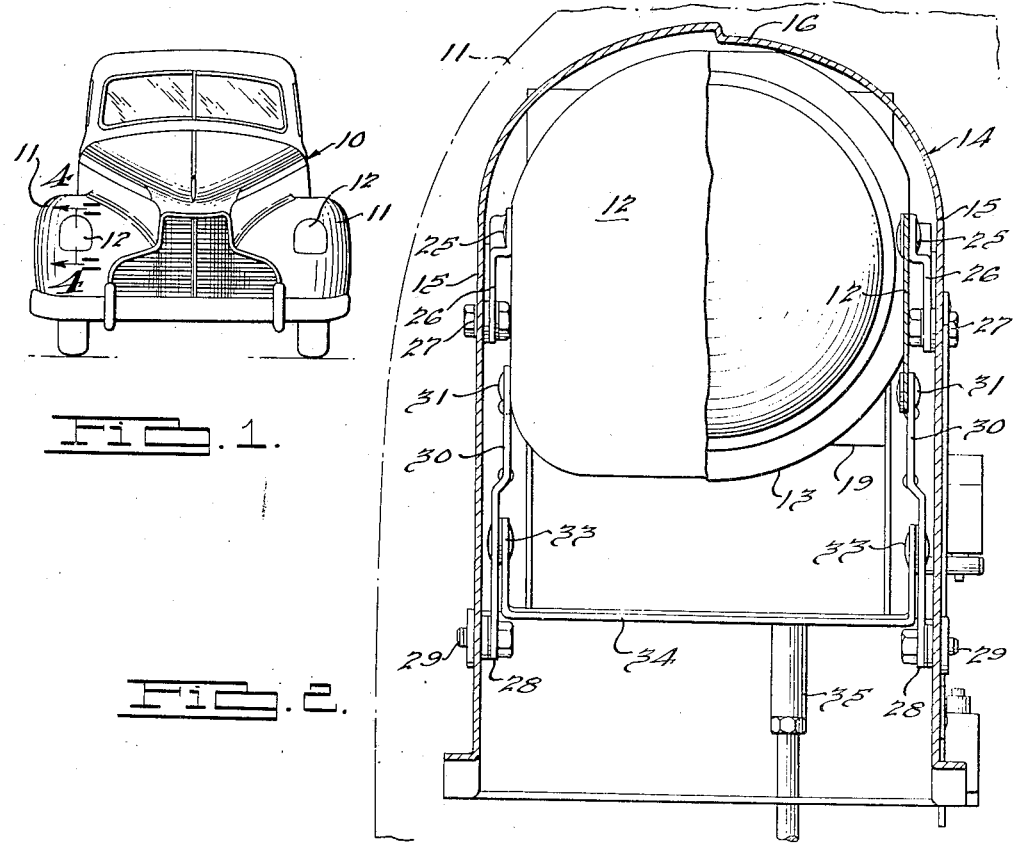
Fig. 1.
Fig. 2.
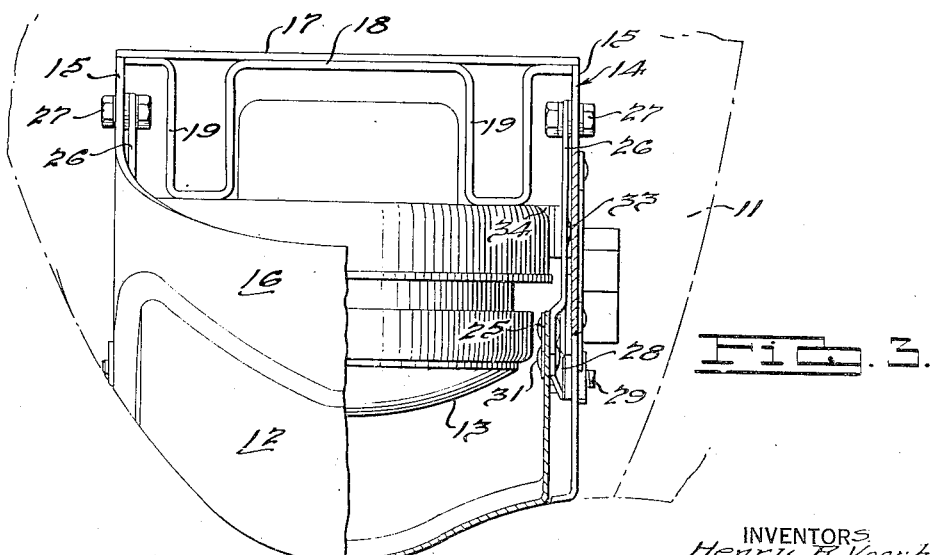
Fig. 3.
INVENTORS
Henry R. Voorhees,
George E. Breeze,
BY Harness, Lind, Patee & Harris
ATTORNEYS.

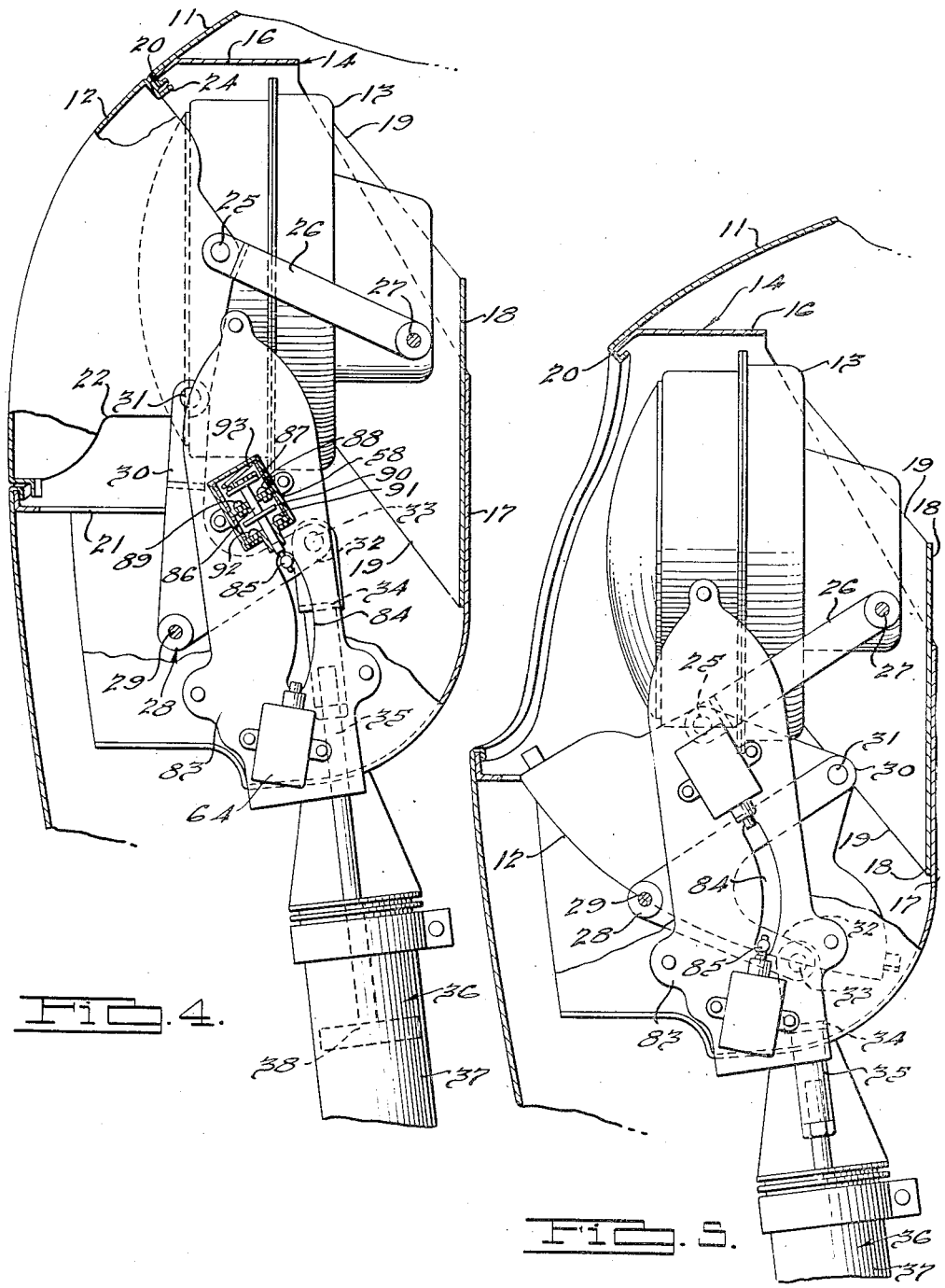

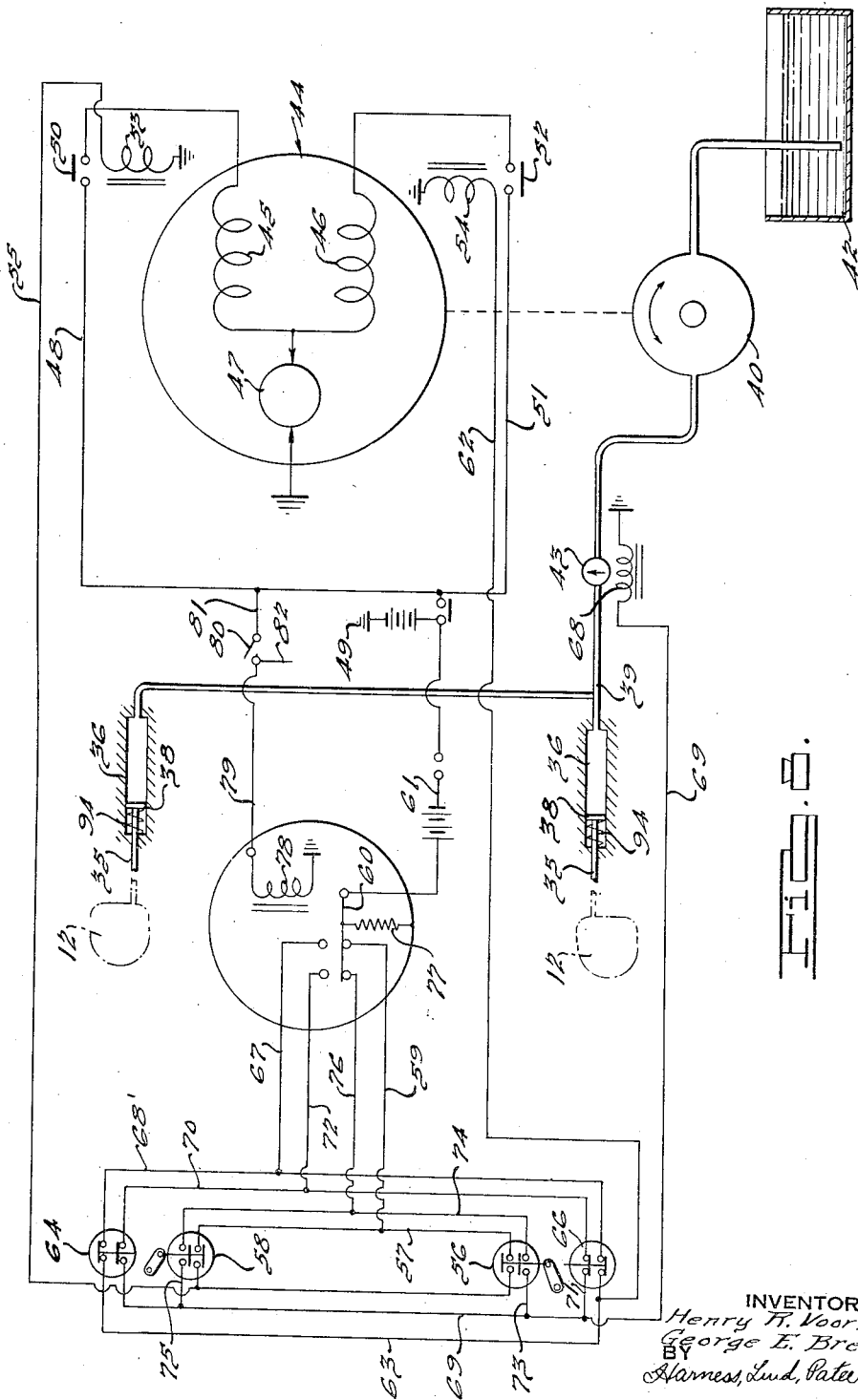

Patented July 20, 1943

2,324,742

UNITED STATES PATENT OFFICE 2,324,742

MOTOR VEHICLE LIGHTING

Henry R. Voorhees, Detroit, and George E. Breeze, Highland Park, Mich., assignor to Chrysler Corporation, Highland Park, Mich., a corporation of Delaware Application July 3, 1941, Serial No. 400,926

5 Claims. (Cl. 240—7.1)

This invention relates to motor vehicles and more particularly to improvements in the lighting therefor.

The main object of the invention is to provide a motor vehicle in which the frontal surface is provided with an opening behind which is disposed a lamp, and a closure for the opening movable to open and closed positions with respect thereto and which, when in its closed position, preserves the contour of the surface, together with improved means for operating the cover.

Another object of the invention is to provide operating means for a closure of the foregoing, including a fluid pressure system and a pointer operator therefor together with improved control means for operating the same in timed relationship.

The invention contemplates an arrangement by which the closure is placed in an open position with respect to the opening when the lamp is lighted and will be placed in closed position with respect to this opening when the lamp is unlighted. It is therefore an object of the invention to provide means for insuring this relationship and for this purpose the invention preferably includes an electric lamp and an electrically actuated power operator, operation of the latter being initiated incident to opening and closing of the energizing circuit for the lamp and wherein operation of the operator ceases incident to movement of the closure from one of its positions to another thereof under influence of power furnished by the operator.

Other objects of the invention will be more apparent taken in connection with the accompanying drawings, in which:

Fig. 1 is a front elevational view of a motor vehicle embodying the invention.

Fig. 2 is an enlarged fragmentary front elevational view illustrating more particularly one of the lamps, the closure associated therewith, and a portion of the operating mechanism for the latter, parts being broken away and in section.

Fig. 3 is a top plan of the showing in Fig. 2, parts being broken away and in section.

Fig. 4 is a side elevational view, partly in section, of the showing in Figs. 2 and 3.

Fig. 5 is a view similar to Fig. 4, but illustrating the closure and a portion of the operating mechanism therefor in another position.

Fig. 8 is a diagrammatic view illustrating the power operating means for the closure members together with a wiring diagram therefor.

Figure 6:
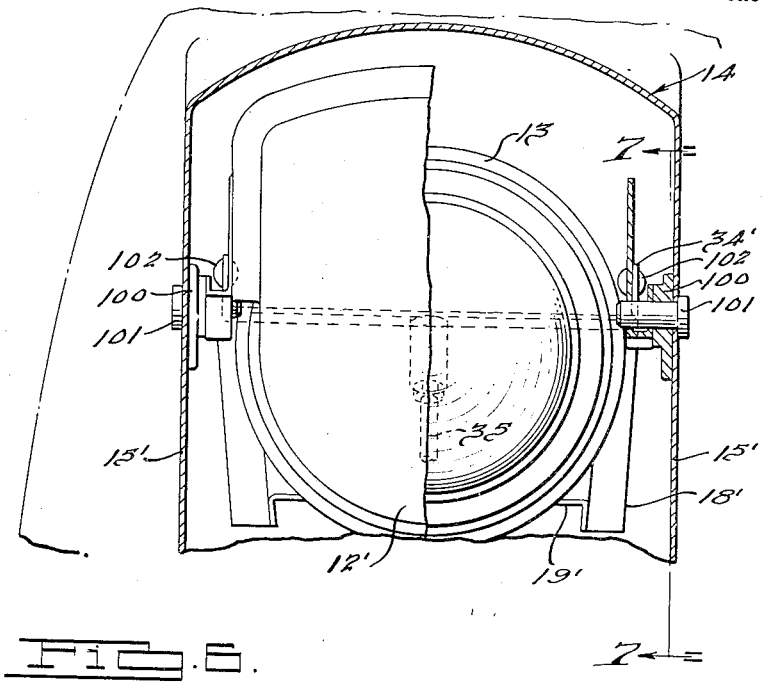
Fig. 6 is a view similar to Fig. 2 but illustrating a modified form of the invention.

Referring to the drawings and particularly Figs. 1 to 5, inclusive, the numeral 10 designates a motor vehicle having spaced front fenders 11 each having an opening in the frontal surface thereof and a closure 12 therefor, the latter having a surface contour which preserves the fender contour. Positioned rearwardly with respect to each opening and at closure 12 is an electric lamp unit 13 of conventional construction adapted to cast light rays forwardly of the vehicle when the closure is moved to an open position. The closure is adapted to be moved between the associated opening and lamp to its open and closed positions and inasmuch as the mounting and movement of each lamp closure 12 is the same the description will in the latter respect be confined to a single member.

Carried by the fender 11 is a support member, generally indicated by the numeral 14, having spaced side forming walls 15 connected at the top thereof by an arcuately shaped wall 16, and a back wall 17. The lamp 13 is fixedly secured to the support 14 by an attaching member having a portion 18 abutting and secured to the wall 17 of the member 14 and having laterally spaced forwardly extending channel-shaped arms 19 secured to the casing of the lamp 13 (see Fig. 3). The lateral extremities of the portion 18 and the outer wall of each channel arm 19 extend downwardly below the central portion of the attaching member, as shown in Fig. 2.

In attaching the member 14 to the fender 11 the edge of the portion 16 is deflected to extend between the channeled wall 20 bounding the opening in the fender and secured thereto by welding. A reinforcing member 21 extends between the side walls 15 of the member 14 and has side flanges 22 respectively secured to these walls, the frontal edge being deflected to extend between the channeled wall 20 bounding the opening in the fender. The closure 12 is provided with a flange 24 overlapping the channeled wall 20.

The closure 12 is supported from the member 14 for movement between the lamp 13 and the fender opening in order to be selectively positioned as indicated in Fig. 4 or as indicated in Fig. 5. The closure has laterally spaced rearwardly extending sides to the upper portion of each of which is pivotally attached as at 25 one end of an arm 26, the other end of the latter being pivotally attached at 27 to the adjacent portion 15 of the member 14. A bell crank 28, pivotally secured at 29 to each portion 15, has an arm 30 pivotally secured at 31 to the adjacent side of the closure 12, and a second arm 32 pivotally secured at 33 to a cross member 34.

The center of the pivot 31 is disposed to the left, as viewed in Fig. 4, of a line connecting the pivot centers 25 and 29. An operating rod 35 is secured to the cross member 34 and is movable upwardly and downwardly by means hereinafter more fully described to rotate the bell crank 28.

In operation of the mechanism thus far set forth, downward movement of the rod 35 rotates the bell crank in a clockwise direction, as viewed in Fig. 4 and the closure 12 and operating mechanism are moved to the respective positions shown in Fig. 5, the closure being rotated in an anticlockwise direction. Initial movement of the bell crank moves the lower part of the closure to a position which will clear it with respect to the adjacent wall 20 bounding the opening, the clearance of this wall and the closure accommodating movement of the closure. This clearing of the closure with respect to the opening is aided also by the movement imparted to the closure during movement of the pivot 31 to a position where it crosses a line connecting the centers 25 and 29.

Each rod 35 is operated by a fluid motor, generally indicated at 36, including a cylinder 37 and a reciprocal piston 38 therein connected with the rod 35. Fluid is supplied under pressure by a conduit 39 in fluid communication with a reversible pump 40 and the motors 36. A conduit 41 leads from a fluid source 42 to the pump 40. A normally closed valve 43 in the conduit 39 controls the passage of fluid from the pump 40 to the motors 36, the valve being opened as hereinafter set forth during operation of the pump 40.

An electric motor, indicated at 44, is adapted to drive the pump, this motor being of the reversible type, including the field coils 45 and 46 and armature 47, in order to reverse the flow of fluid pumped. The coil 45 is provided with an energizing circuit including the wire 48 connected with a storage battery 49, a relay switch 50 being interposed between the battery 49 and coil 45, and an energizing circuit including the wire 51 is provided for the coil 46, a relay switch 52 being interposed between the battery and coil 46. The switches 50 and 52 are normally in open position with respect to their circuits and are adapted to be selectively closed. Upon closing of one thereof, one of the coils 45, 46 will be energized and the pump will be driven in a direction to draw fluid from the source 42 or else return it to the latter and when the other switch is closed the other coil will be energized with an accompanying reversal of the motor drive to the pump together with a reversal of fluid flow.

The switch 50 is closed by electrically actuated means including a field coil 53 and the switch 52 is closed by similar means including the field coil 54. A suitable energizing circuit is provided for the coil 53, including the wire 55, the double circuit switch 56, wire 57, the double circuit switch 58, wire 59, switch member 60 and wire 61 to battery 49. A similar energizing circuit is provided for the coil 54 including the wire 62, wire 63, double circuit switch 64, wire 63', double circuit switch 66, wire 67, switch member 60, and wire 61 to battery 49.

The valve 43, normally closed, is adapted to be opened when the respective circuits for energizing the motor field coils 45 and 46 are closed in order that fluid can pass to and from the motors 36. The valve 43 is moved to an open position by electrically actuated means including a field coil 68 adapted to be closed when the energizing circuit for either of the coils 53 or 54 is closed. The energizing circuit for the electrically actuated valve operating means whereby the valve is operated upon energization of the coils 46 and 54 includes the wire 69, double circuit switch 64, wire 70, double circuit switch 66, wire 71, wire 72, switch member 60 and wire 61 to battery 49. Thus, when the switch member 60 is moved to close the energizing circuit for the coils 46 and 54 the foregoing circuit for the valve opening means will be closed. In order to energize the valve operating means for opening of the valve means 43 upon energization of the coils 45 and 53, the wire 69 is connected through the double circuit switches 56 and 58 by wires 73, 74 and 75, wire 76 leading from wire 74 for connection by switch member 60 and thence to battery 49.

The switch member 60 is urged to its illustrated position by a spring 77 and is moved to its other position by electrically actuated means including the field coil 78 having an energizing circuit including the wire 79, switch 80 and wire 81 connected with the wire 49 leading to battery 49. The wire 81 and switch are disposed in the energizing circuit, not fully shown but including the wire 82 for the vehicle headlamps 13.

The double circuit switches 58 and 64 are associated with the headlamp 13 disposed at the right hand side of the vehicle as viewed by an occupant of the latter while the similar switches 56 and 66 are associated with the other lamp 13. The mounting and operation of the switches 58 and 64 are more particularly illustrated in Figs. 4 and 5, it being understood that the switches 56 and 66 are similarly disposed with respect to the other headlamp, and that, furthermore, the switches 64 and 66 are simultaneously operated while the switches 56 and 58 are simultaneously operated.

The switches 58 and 64 are carried by a plate 83 secured to a side wall 15 of the support member 14, this plate having an elongated arcuately extending slot 84 through which a pin 85, rotatable with the bellcrank arm 32, extends. Each of the double circuit switches, as illustrated more particularly in connection with the switch 58, includes a rod 86 which carries a switch element 87 engageable with the contacts 88, 89 and a second element 90 engageable with the contacts 91, 92, a spring 93 urging the rod 86 to a position at which the switch elements engage the contacts as aforesaid.

When the closures 12 are in closed position, as illustrated in Figs. 1 and 4, the upper switches 56 and 58 are in open position with respect to their circuits and the lower switches 64 and are in closed position with respect to their respective circuits, at which time, of course, the headlamp circuit control switch is in open position, all as shown in Fig. 8.

Assuming now that the headlamps are to be lighted, the switch 80 controlling the headlamp energizing circuit is closed, the circuit to the coil 78 being thereby closed and the latter energized whereupon the switch member is moved to a position engaging contact points for the wires 67 and 72. The circuit to the coil 54 is thus closed and the switch 52 closes the circuit to the motor coil 46, the circuit to the valve operating mechanism including the coil 68 is closed and the valve 43 opened, the motor being thus energized to drive the pump in a direction to withdraw fluid trapped in the line, the pistons 38 being moved downwardly, as viewed in Fig. 4 under the influence of the springs 94, the rod 35 rotating the bell crank 28 as heretofore described to move the closures 12 to open position, as shown in Fig. 5. This movement results in the upper double circuit switches 56 and 58 being closed by the action of the springs 93 and opening of the lower double circuit switches 64 and 66 by the pin 85 engaging the rods 86 thereof. Opening of the switches 64 and 66, in response to movement of the closures 12 to open position, opens the circuit to the switch operator at 54 and the circuit to the valve operator 68, whereupon the motor 44 ceases operation and the valve 43 closes, trapping fluid within the conduit communicating with the motors 36. As long as the switch 80 is in closed position, the circuit for the electrical actuating means for the switch member 60 is closed and the latter is retained in engagement with the contacts for the wires 67 and 72.

Assuming that it is now desired to turn the headlamps 13 off, the switch 80 is moved to the position shown in Fig. 8 to open the circuit therefor, whereupon the circuit to the electrical actuating means for the switch member 60 is opened and the latter is returned by the spring 77 to its Fig. 8 position. It will be noted that the upper switches 56 and 58 were moved to closed position upon opening of the closures 12, so that when the switch member 60 engages the contacts for the wires 59 and 76 the circuit to the electrically actuated means, including the coil 53, is closed and the switch 50 closes the circuit to the motor field coil 45, and the circuit for the electrical actuating means including the coil 68, for the valve 43 is closed, whereupon the valve is opened and the motor operated to drive the pump to supply fluid to the motors 36 and thus move the pistons 38 and rods 35 upwardly thereby swinging the bell crank 28 in an anti-clockwise direction to move the closures 12 clockwise to the closed position as shown in Fig. 4. The upper switches 56 and 58 are moved by the pin 85 to open position with respect to their circuits, when the members 12 are in closed position, and these circuits are opened.

Figure 7:
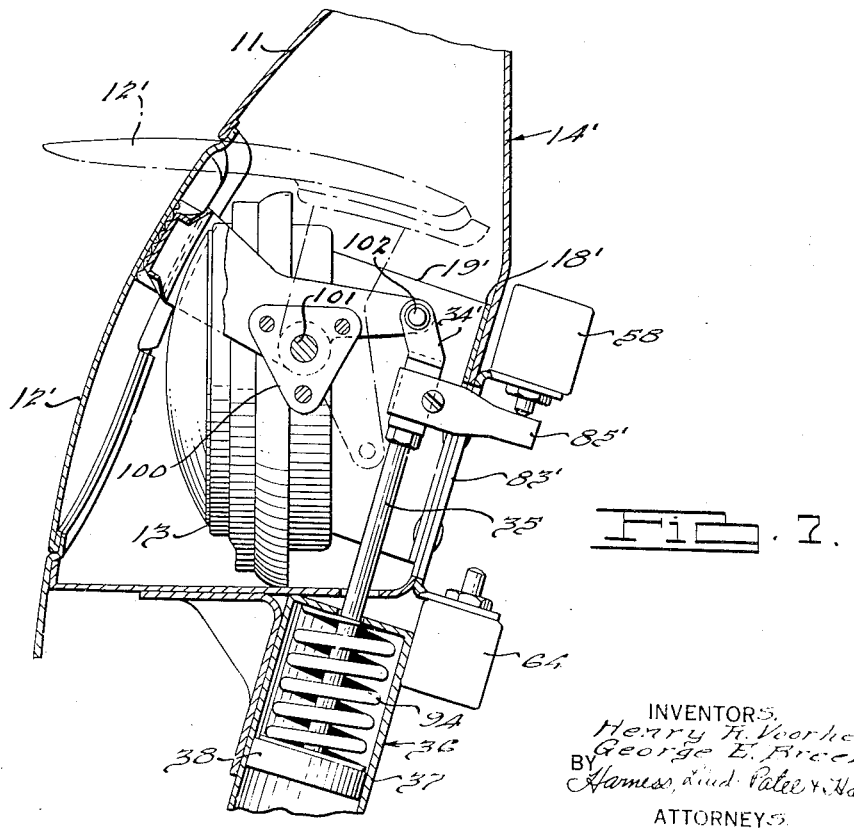
Fig. 7 is a side elevational view, partly in section, taken as indicated by the line 7—7 of Fig. 6.

Referring to Figs. 6 and 7, the closure 12' is adapted for operation under control of the mechanism illustrated in Fig. 8 as heretofore set forth in connection with the embodiment of Figs. 1 to 5. The lamp 13 is fixedly positioned by the support member having the portions 18' and 19' respectively secured to the member 14' and lamp 13.

The closure 12' has rearwardly extending side portions deflected to channel-shape, as shown at the right in Fig. 6, each leg of a channel arm having an aperture aligned with an aperture in an adjacent bearing support 100 for reception of a pin 101 by which the closure 12' is mounted for swinging movement. A cross member 34' extends between the side portions of the closure member 12' and is secured thereto by the rivets 102. The operating rod 35 is secured to the member 34'.

The switches 56 and 64 are carried by a plate 83', secured to the support 14', the latter and the plate 83' having registering slots through which projects the switch operating rod 85' secured to and movable with the rod 35.

Operation of the closure 12' is effected in a manner similar to that set forth for the closure 12, it being noted that upon downward movement of the rod 35 the closure 12' is rotated to the dotted line position shown in Fig. 7. In the present embodiment, the upper edge portion of the closure 12' overlaps and abuts the inner face of the fender while the lower edge portion overlaps and abuts the outer face of the fender.

Although but several embodiments of the invention are herein shown and described, it will be understood that various changes in the size, shape and arrangement of parts may be made without departing from the spirit of my invention and it is not my intention to limit said invention other than by the terms of the appended claims.

We claim:

1. In a motor vehicle having a frontal surface provided with an opening, a lamp disposed rearwardly of the opening, a closure member movable between the lamp and opening to closed and opened positions respectively with respect to the latter; an electric motor, a pump adapted to be driven by said motor, a relay-controlled switch controlling operation of said motor, a fluid motor operably connected to said closure member, a conduit leading from said pump to said motor, a normally closed valve in said conduit adapted when closed to trap fluid in said motor to thereby retain the closure member in one of its said positions, electrically actuated means operable upon energization to open said valve, parallel energizing circuits for said relay-controlled switch and for said electrically actuated means, relay-controlled switch means for closing said circuits, and switch means operable incident to movement of said closure member to one of its said positions to open one of said circuits and to condition the other of said circuits for closure by said relay-controlled switch.

2. In a motor vehicle having a frontal surface provided with an opening, a lamp disposed rearwardly of the opening, a closure member movable between the lamp and opening to closed and opened positions respectively with respect to the latter; an electric motor, relay-controlled switch means controlling operation of said motor, a pump adapted to be driven by said motor, a fluid motor operably connected to said closure member, a conduit leading from said pump to said motor, a normally closed valve in said conduit adapted when closed to trap fluid in said motor to thereby retain the closure member in one of its said positions, electrically actuated means operable upon energization to open said valve, parallel energizing circuits for said relay-controlled switch means and for said electrically actuated means, an energizing circuit for said lamp, a relay-controlled switch operable upon energization of said lamp circuit to close said circuits, and switch means operable incident to movement of said closure member to one of its said positions to open one of said parallel circuits and to condition the other of said parallel circuits for closure by said relay-controlled switch.

3. In a motor vehicle having a frontal surface provided with an opening, a lamp disposed rearwardly of the opening, a closure member movable between the lamp and opening to closed and opened positions respectively with respect to the latter; an electric motor, a pump adapted to be driven by said motor, a relay-controlled switch controlling operation of said motor, a fluid motor operably connected to said closure member, a conduit leading from said pump to said motor, a normally closed valve in said conduit adapted when closed to trap fluid in said motor to thereby retain the closure member in one of its said positions, electrically actuated means operable upon energization to open said valve, energizing circuits for said relay-controlled switch and for said electrically actuated means, switch means disposed in closed position with respect to said circuits when said closure member is in its closed position, other switch means disposed in opened position with respect to said circuits when said closure member is in its closed position, an energizing circuit for said lamp, means operable in response to energization of said lamp for disposing said other switch means in closed position with respect to the first mentioned energizing circuits, and means operable to dispose said switch means in opened position with respect to the last mentioned circuits in response to movement of said closure member to its open position.

4. In a motor vehicle having a frontal surface provided with an opening, a lamp disposed rearwardly of the opening, a closure member movable between the lamp and opening to closed and opened positions respectively with respect to the latter; a reversible electric motor, means operable in response to operation of said motor for moving said closure member between its said positions, a first relay controlled switch operable to effect operation of said motor to cause said means to move said closure member from an open to a closed position, a second relay-controlled switch operable to effect operation of said motor to cause said means to move said closure member from a closed to an open position, an energizing circuit for each of said switches, a switch member movable to selectively close said circuits, an energizing circuit for said lamp adapted to be opened and closed, and electro-magnetic means energizable in response to closing of said lamp circuit for moving said switch member to close the energizing circuit for said second relay-controlled switch.

5. In a motor vehicle having a frontal surface provided with an opening, a lamp disposed rearwardly of the opening, a closure member movable between the lamp and opening to closed and opened positions respectively with respect to the latter; a reversible electric motor, means operable in response to operation of said motor for moving said closure member between its said positions, a first relay controlled switch operable to effect operation of said motor to cause said means to move said closure member from an open to a closed position, a second relay-controlled switch operable to effect operation of said motor to cause said means to move said closure member from a closed to an open position, an energizing circuit for each of said switches, a switch member movable to selectively close said circuits, an energizing circuit for said lamp adapted to be opened and closed, electro-magnetic means in said lamp circuit operable incident to closing of the latter to move said switch member to close the energizing circuit for said second relay-controlled switch whereby said closure member is moved to its said open position, switch means operable to open the last mentioned circuit incident to movement of said closure member to its said open position, and means for causing said switch member to close said first relay-controlled switch circuit when said lamp circuit is opened whereby said closure member is moved to its closed position.

HENRY R. VOORHEES.
GEORGE E. BREEZE.